Patented Apr. 17, 1923.

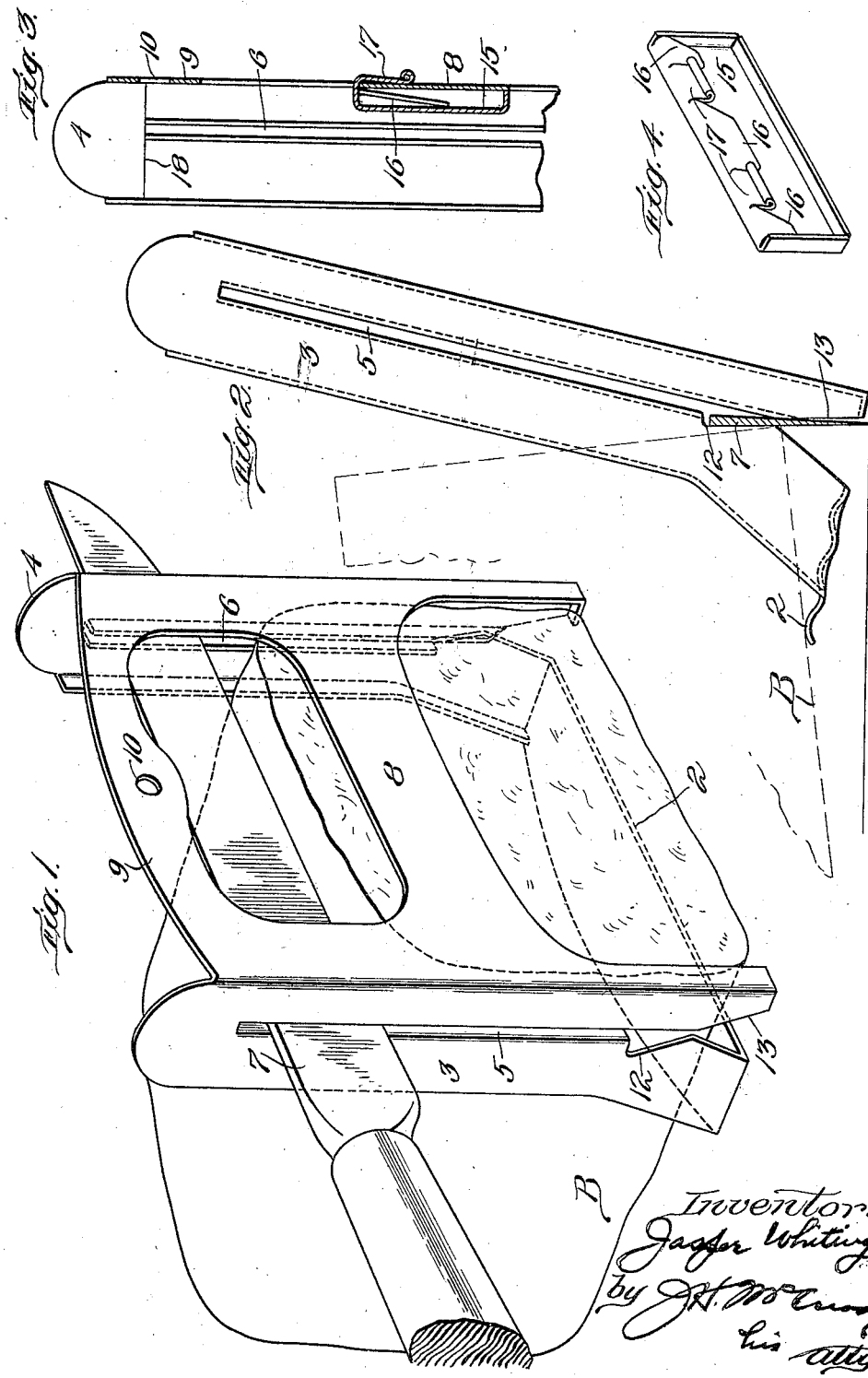
Apr. 17, 1923.
J. WHITING
BREAD SLICER
Filed Aug. 8, 1922
1,452,474

1,452,474

UNITED STATES PATENT OFFICE.

JASPER WHITING, OF BOSTON, MASSACHUSETTS.

BREAD SLICER.

Application filed August 8, 1922. Serial No. 580,499.

*To all whom it may concern:*

Be it known that I, JASPER WHITING, a citizen of the United States, residing at Boston, in the county of Suffolk and State of Massachusetts, have invented certain new and useful Improvements in Bread Slicers, of which the following is a specification.

This invention relates to devices for use in slicing bread and the like to facilitate the cutting of slices of uniform thickness.

The invention aims to devise an article of this character which will be convenient to use, can readily be adjusted to change the thickness of the slices cut, and which can be manufactured economically and sold at a very low price.

The nature of the invention will be readily understood from the following description when read in connection with the accompanying drawings, and the novel features will be particularly pointed out in the appended claims.

In the drawings:

Figure 1 is a perspective view of a device embodying the invention in the form at present preferred, showing a loaf of bread and a knife associated therewith in position to perform the slicing operation;

Fig. 2 is a side elevation of the device shown in Fig. 1, the knife being shown in cross section;

Fig. 3 is a central cross sectional view of the upper part of the device shown in Fig. 1, but showing it equipped with a spacing attachment which reduces the thickness of the slice that will be cut; and Fig. 4 is a perspective view of the spacing attachment.

The construction shown comprises a base 2 having upright guides 3 and 4 at opposite ends thereof, these guides being spaced apart far enough to receive the loaf of bread B between them. The guides are provided with vertical slots designated at 5 and 6, respectively, which are designed to receive and guide a knife 7 of any character suitable for slicing the bread. Preferably the base 2 is corrugated, as best shown in Fig. 2, to keep the bread from slipping relatively to the device. The forward edge of the base terminates at a point behind the slots 5 and 6, and these slots are open at their lower ends but closed at their upper ends so that there is nothing to prevent the knife from cutting entirely through the bread and cutting against the bread board or other support on which the device is placed. At the front of the device the two guides 3 and 4 are connected by a plate 8 which forms an abutment or stop for the end of the loaf B. These guides preferably also are connected by an upper plate or web 9 having a hole 10 therein by means of which the device may be hung on a nail or hook when not in use.

In using the device the blade of the knife 7 is inserted in the lower ends of the slots 5 and 6, and moved upwardly to a point near the upper ends of the slots. The loaf of bread is placed on the base 2 with its end abutting against the stop 8, and the knife is then moved backward and forward in the usual manner to cut a slice of bread off the end of the loaf, the knife being guided accurately by the walls of the slots during this operation. When this operation has been completed the knife is then at the lower part of the slots, and in order to facilitate the removal of the slice which has just been cut off, the lower edge of the abutment or stop 8 is spaced at a considerable distance above the base so that when the slicing device and the loaf B are lifted the slice of bread just severed will drop out. It will be observed that since the forward edge of the base 2 terminates behind the slots 5 and 6, there is nothing to support the slice of bread when the device is lifted in the manner just described. For the purpose of facilitating this lifting operation, the rearward wall of each of the slots 5 and 6 is notched, as best shown at 12, Figs. 1 and 2, and the rearward edge of the front wall of the standard is cut away below the notch, as shown at 13. When the cutting of the slice has been completed, the knife blade is tipped sufficiently to tip the upper end of the device forward into substantially the inclined position shown in Fig. 2, or this operation may be performed by tipping the loaf. By returning the knife blade 7 to its straightened or vertical position, the back or upper edge of the knife will engage the shoulders at the upper ends of the notches 12 and the slicing device may then be lifted simply by lifting the knife. When the slice of bread just cut off has dropped out, the parts are returned to their initial positions, the loaf of bread is moved forward against the stop or abutment 8, and the operations above described are repeated.

It will be evident that the thickness of each slice of bread severed from the loaf B will be determined by the distance of the slots 5 and 6 behind the stop plate or abutment 8. This distance, in the device shown, has been made equal to the thickness of bread usually required for toast or ordinary table purposes. When it is desired to cut thinner slices, as for instance, in making thin sandwiches, a spacing attachment 15 is placed on the abutment 8. This spacing device consists of a sheet metal member of substantially the form shown in Figs. 3 and 4, having inturned margins and provided at its top with three inwardly bent tongues 16 and two outwardly bent tongues 17. The device is slipped on the upper edge of the abutment with the tongues 16 bearing against the inner surface of the abutment and the tongues 17 against the outer surface, so that the device will be held firmly on the abutment by the resiliency of the parts 16 and 17. It can readily be removed when not needed by pushing it upwardly off the abutment. Other spacing devices of different thicknesses may be used if desired.

For manufacturing reasons I prefer to make the base 2 and the rearward parts of the guides 3 and 4 in one piece, and to make the portions of the guides in front of the slots 5 and 6 integral with the parts 8 and 9. That is, each guide may be regarded as consisting of a front and rear standard separated by a slot, and the two front standards preferably are made integral with the plates 8 and 9 while the two rear standards are integral with the plate 2. The standards at each side are united at their upper ends by means of a plate, the lower edge of the plate for the guide 4 being shown at 18, Fig. 3. This plate is soldered across the upper ends of the standards of the guide 4 so that in outward appearance the guide seems to consist of a single piece. Any other suitable manufacturing expedient may be substituted, however, for this arrangement. The standards forming the two guides 3 and 4 preferably also are of channel cross section, as clearly shown, this construction giving added strength and rigidity to the device and providing rounded edges at each side of the knife guiding slots 5 and 6. The parts of the device can readily be cut out of sheet metal and bent into the desired form by means of suitable punches and dies.

It will now be appreciated that this invention provides a very simple form of bread slicing device which is very convenient to use, which can readily be adjusted by means of the spacing member above mentioned to change the thickness of the slices cut, and which is so constructed that it can be manufactured very economically.

While I have herein shown and described the best embodiment of my invention which I have so far devised, it will be evident that this embodiment may be modified in many particulars without departing from the spirit or scope of the invention.

It will also be understood that while the device has been particularly described as a bread slicer, it is also useful in slicing cake, cold meats and other food products, or any material that can readily be cut into thin slices by means of a knife.

Having thus described my invention, what I desire to claim as new is:

1. A bread slicing device comprising in combination, a base having upright guides spaced apart to receive a loaf of bread between them, each of said guides having a vertical knife guiding slot therein open at its lower end and extending to a point near the top of the guide, and means connecting said guides at the front of the device and forming an abutment for the end of the loaf of bread.

2. A bread slicing device comprising in combination, a base having upright guides spaced apart to receive a loaf of bread between them, each of said guides having a vertical knife guiding slot therein open at its lower end and extending to a point near the top of the guide, and a member at the front of the device forming an abutment for the end of the loaf of bread, the lower edge of said member being spaced substantially above said base whereby a slice of bread severed from said loaf may drop out under said member.

3. A bread slicing device comprising in combination, a base having upright guides spaced apart to receive a loaf of bread between them, each of said guides having a vertical knife guiding slot therein open at at its lower end and extending to a point near the top of the guide, said base terminating at a point behind the lower ends of said slots, and a plate connecting said guides at the front of the device and forming an abutment for the end of the loaf of bread, the lower edge of said plate being spaced substantially above said base whereby a slice of bread severed from said loaf may drop out under the plate.

4. A bread slicing device comprising in combination, a base having upright guides spaced apart to receive a loaf of bread between them, each of said guides having a vertical knife guiding slot therein open at its lower end and extending to a point near the top of the guide, notches formed in the lower portions of said slots, said notches having shoulders at their upper ends with which the back of the knife may engage after the cutting of a slice has been completed to enable a lifting movement of said knife to lift said device, and an abutment at the front of said device having its lower edge spaced substantially above said base.

5. A bread slicing device comprising in combination, a base having upright guides spaced apart to receive a loaf of bread between them, each of said guides having a vertical knife guiding slot therein, an abutment for limiting the forward movement of said loaf relatively to said guides, and a spacing member cooperating with said abutment to determine the thickness of the slice to be cut, said member being movable into and out of cooperative relationship to said abutment.

6. A bread slicing device comprising in combination, a base having upright guides spaced apart to receive a loaf of bread between them, each of said guides having a vertical knife guiding slot therein, an abutment for the end of the loaf of bread connecting said guides at the front of said device, and a spacing member cooperating with said abutment to determine the thickness of the slice to be cut, said member being movable into and out of cooperative relationship to said abutment.

7. In a bread slicing device, the combination of a corrugated sheet metal base having upright standards at opposite ends thereof, said standards being spaced apart to receive a loaf of bread between them, a front plate forming an abutment for the end of the loaf of bread and having standards formed at opposite sides thereof, the standards at each side of said device being connected at their upper ends and spaced apart to provide a vertical knife guiding slot between them, and each of said standards being of channel cross section.

8. A bread slicing device comprising, in combination, a base having upright guides spaced apart to receive a loaf of bread between them, each of said guides having a vertical slot therein to guide the blade of a knife with which the bread slicing operation is performed, and means at the lower portions of said slots arranged to be engaged by said knife to enable a lifting movement of said knife to lift said device, and an abutment for limiting the forward movement of said loaf relatively to said guides.

JASPER WHITING.